(12) United States Patent
Narui et al.

(10) Patent No.: US 12,309,230 B2
(45) Date of Patent: May 20, 2025

(54) MANAGEMENT DEVICE, MANAGEMENT SYSTEM, AND MANAGEMENT METHOD FOR CLASSIFYING AN OPERATION PATTERN

(71) Applicant: Mitsubishi Electric Corporation, Tokyo (JP)

(72) Inventors: Tomohiro Narui, Tokyo (JP); Shuichi Murayama, Tokyo (JP); Kazuyuki Nagahiro, Tokyo (JP); Fuyuki Sato, Tokyo (JP); Toshihiro Mega, Tokyo (JP); Genta Yoshimura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/382,196

(22) Filed: Oct. 20, 2023

(65) Prior Publication Data

US 2024/0048617 A1 Feb. 8, 2024

Related U.S. Application Data

(63) Continuation of application No. PCT/JP2021/017053, filed on Apr. 28, 2021.

(51) Int. Cl.
*G16Y 40/10* (2020.01)
*G16Y 40/35* (2020.01)
(Continued)

(52) U.S. Cl.
CPC .............. *H04L 67/12* (2013.01); *G16Y 40/10* (2020.01); *G16Y 40/35* (2020.01)

(58) Field of Classification Search
CPC ........ H04L 67/12; G16Y 40/10; G16Y 40/35; G05B 2219/2639; G05B 19/042; G05B 19/418
See application file for complete search history.

(56) References Cited

U.S. PATENT DOCUMENTS 9,569,804 B2 * 2/2017 Stein ................. H02J 3/003
2012/0084030 A1 * 4/2012 Kitagawa ........... G05B 23/0283
702/61
2022/0405161 A1 * 12/2022 Serita ................. G06N 20/00

FOREIGN PATENT DOCUMENTS

JP 2010-169328 A 8/2010
JP 2010-250381 A 11/2010
(Continued)

OTHER PUBLICATIONS

International Search Report (PCT/ISA/210) issued in PCT/JP2021/017053, dated Jul. 20, 2021.
(Continued)

*Primary Examiner* — Kamal M Hossain
(74) *Attorney, Agent, or Firm* — Birch, Stewart, Kolasch & Birch, LLP

(57) ABSTRACT

A management device includes: an acquisition unit that acquires operating history data for an equipment device in a prescribed time period; and a classification processing unit that classifies, based on the operating history data acquired by the acquisition unit, an operating pattern of the equipment device in the prescribed time period. The classification processing unit includes: an operating pattern calculation unit that calculates a first operating pattern in a first time period and a second operating pattern in a remaining second time period when the prescribed time period is divided into unit time periods; a change calculation unit that calculates a degree of change in the operating pattern using the first operating pattern and the second operating pattern when the prescribed time period is divided into unit time periods; a split point calculation unit that calculates, as a split time point, a time point where the degree of change satisfies a prescribed condition for the prescribed time period; and a (Continued)

split processing unit that splits the prescribed time period at the calculated split time point.

10 Claims, 10 Drawing Sheets

(51) Int. Cl.
*H04L 67/12* (2022.01)
*G05B 19/042* (2006.01)
*G05B 19/418* (2006.01)

(56) References Cited

FOREIGN PATENT DOCUMENTS

| JP | 2011-34295 A | 2/2011 |
|---|---|---|
| JP | 6745641 B2 | 8/2020 |
| WO | 2017/033282 A | 3/2017 |

OTHER PUBLICATIONS

Office Action issued in JP Application No. 2023-501882, dated Aug. 1, 2023.
Written Opinion of the International Searching Authority (PCT/ISA/237) issued in PCT/JP2021/017053, dated Jul. 20, 2021.
Japanese Office Action for Japanese Application No. 2023-501882, dated Dec. 19, 2023, with English translation.

* cited by examiner

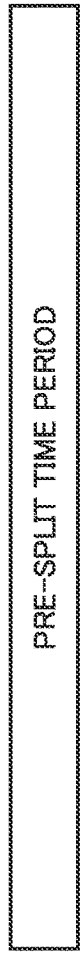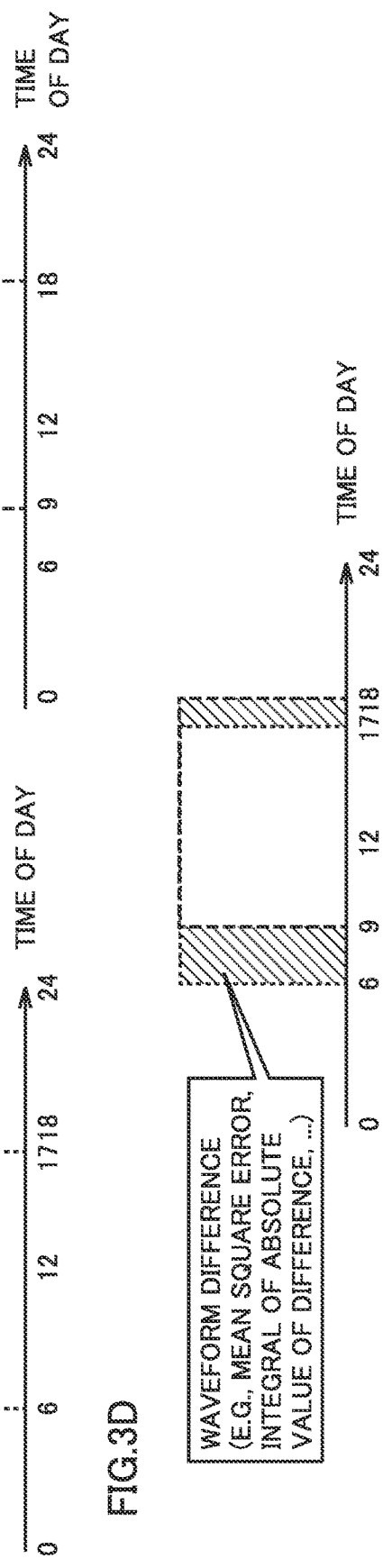

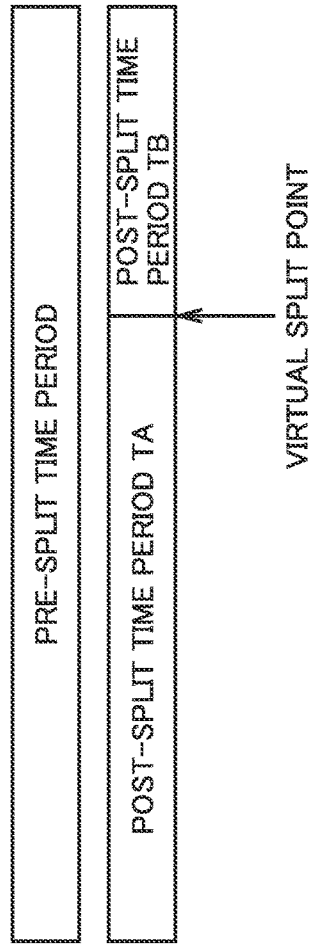
FIG.9A
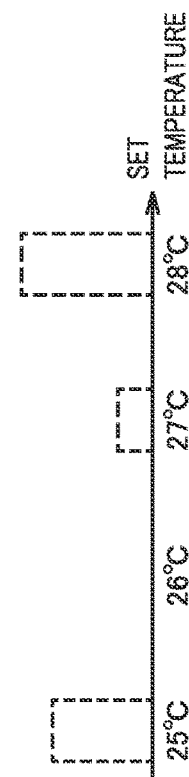
FIG.9B DISTRIBUTION OF SET TEMPERATURE IN TIME PERIOD TA
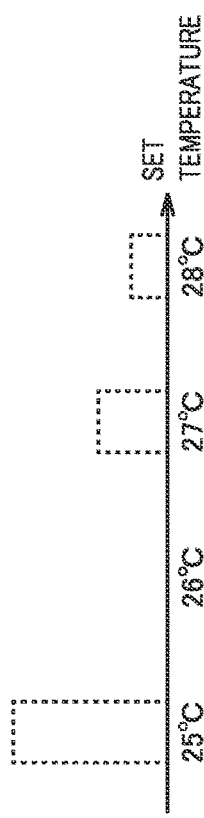
FIG.9C DISTRIBUTION OF SET TEMPERATURE IN TIME PERIOD TB
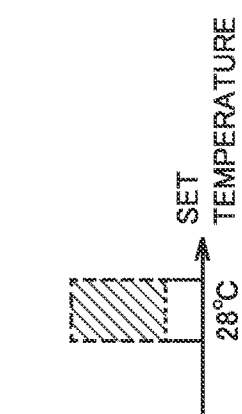
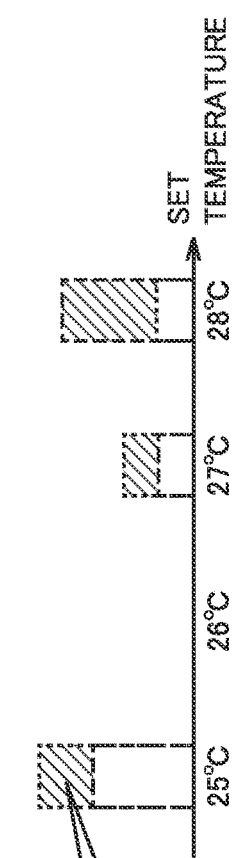
FIG.9D DISTRIBUTION DIFFERENCE (E.G., KL DIVERGENCE, JS DIVERGENCE, KS TEST STATISTIC, ANDERSON-DARLING TEST STATISTIC, SUM OF ABSOLUTE VALUES OF DIFFERENCES, ...)

MANAGEMENT DEVICE, MANAGEMENT SYSTEM, AND MANAGEMENT METHOD FOR CLASSIFYING AN OPERATION PATTERN

CROSS REFERENCE TO RELATED APPLICATIONS

The present application is a continuation of International application No. PCT/JP2021/017053, filed on Apr. 28, 2021, the entire contents of which are incorporated herein by reference.

TECHNICAL FIELD

The present disclosure relates to a management device, a management system, and a management method for managing electric power of a facility such as a building.

BACKGROUND ART

In large-scale facilities such as buildings and factories, a heat source system is used that collectively generates and supplies hot and chilled water, or the amount of heat, for use in an air conditioning system by operating multiple equipment devices serving as heat sources.

In an equipment control system that operates and controls such multiple equipment devices, these equipment devices are discretely switched on and off and operated independently or in parallel depending on the load on the facility, so that these equipment devices are operated efficiently in response to increasing awareness of energy conservation.

Operation patterns of these equipment devices are often determined based on experience and intuition of an operator. Because of this, it has been difficult to objectively determine what operation patterns are actually efficient, and it has not been easy to identify operation patterns that can improve implementation of the equipment devices.

In this respect, Japanese Patent No. 6745641, for example, proposes to classify multiple equipment devices into multiple load groups by clustering operation patterns.

CITATION LIST

Patent Literature

PTL 1: Japanese Patent No. 6745641

SUMMARY OF INVENTION

Technical Problem

However, the actual operating (operation) patterns of equipment devices of buildings and other facilities are not constant, but change over time due to various factors such as addition of equipment devices, replacement of equipment devices, re-layout, moving in and out of tenants, and an outbreak of an infectious disease.

Conventional methods do not identify when the operating patterns of equipment devices have changed, and therefore may present inefficient operation control for the equipment devices.

The present disclosure has been made to solve the above-described problem, and provides a management device, a management system, and a management method that can readily identify a change in an operating pattern of an equipment device.

Solution to Problem

A management device according to an embodiment includes: an acquisition unit that acquires operating history data for an equipment device in a prescribed time period; and a classification processing unit that classifies, based on the operating history data acquired by the acquisition unit, an operating pattern of the equipment device in the prescribed time period. The classification processing unit includes: an operating pattern calculation unit that calculates a first operating pattern in a first time period and a second operating pattern in a remaining second time period when the prescribed time period is divided into unit time periods; a change calculation unit that calculates a degree of change in the operating pattern using the first operating pattern and the second operating pattern when the prescribed time period is divided into unit time periods; a split point calculation unit that calculates, as a split time point, a time point where the degree of change satisfies a prescribed condition for the prescribed time period; and a split processing unit that splits the prescribed time period at the calculated split time point.

A management system according to an embodiment includes: an acquisition unit that acquires operating history data for an equipment device in a prescribed time period; and a classification processing unit that classifies, based on the operating history data acquired by the acquisition unit, an operating pattern of the equipment device in the prescribed time period. The classification processing unit includes: an operating pattern calculation unit that calculates a first operating pattern in a first time period and a second operating pattern in a remaining second time period when the prescribed time period is divided into unit time periods; a change calculation unit that calculates a degree of change in the operating pattern using the first operating pattern and the second operating pattern when the prescribed time period is divided into unit time periods; a split point calculation unit that calculates, as a split time point, a time point where the degree of change satisfies a prescribed condition for the prescribed time period; and a split processing unit that splits the prescribed time period at the calculated split time point.

A management method according to an embodiment includes: acquiring operating history data for an equipment device in a prescribed time period; and classifying, based on the acquired operating history data, an operating pattern of the equipment device in the prescribed time period. The classifying includes: calculating a first operating pattern in a first time period and a second operating pattern in a remaining second time period when the prescribed time period is divided into unit time periods; calculating a degree of change in the operating pattern using the first operating pattern and the second operating pattern when the prescribed time period is divided into unit time periods; calculating, as a split time point, a time point where the degree of change satisfies a prescribed condition for the prescribed time period; and splitting the prescribed time period at the calculated split time point.

Advantageous Effects of Invention

A management device, a management system, and a management method according to an embodiment can readily identify a change in an operating pattern of an equipment device.

The foregoing and other objects, features, aspects and advantages of the present disclosure will become more

BRIEF DESCRIPTION OF DRAWINGS

FIGS. 3A to 3D are diagrams illustrating the concept of a split for an operating pattern of an equipment device in a prescribed time period according to the embodiment.

FIGS. 9A to 9D are diagrams illustrating the concept of a split for a distribution pattern of an operation mode of an equipment device in a prescribed time period according to a third variation of the embodiment.

DESCRIPTION OF EMBODIMENTS

Figure 1:
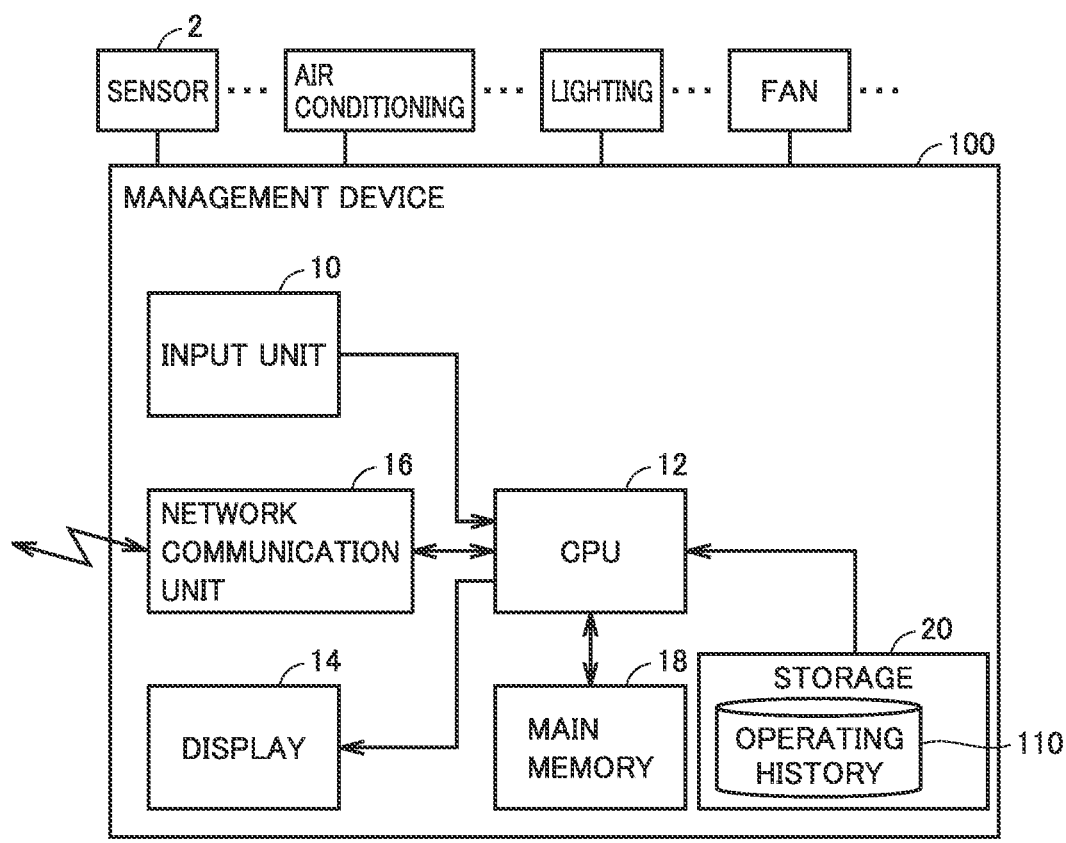
FIG. 1 is a diagram illustrating the concept of a management system 1 according to an embodiment.

An embodiment will be described hereinafter with reference to the drawings. In the following description, the same components are denoted by the same reference characters. Their names and functions are also the same. Therefore, detailed description about them will not be repeated.

A. System Configuration

FIG. 1 is a diagram illustrating the concept of a management system 1 according to an embodiment. Referring to FIG. 1, management system 1 includes equipment devices of a facility such as a building, and a management device 100 that manages these equipment devices. Examples of equipment devices 2 include sensors, air conditioning, lighting, and fans. These equipment devices are not limited to these examples, but may be any power-consuming devices used in the facility.

Management device 100 includes a central processing unit (CPU) 12, a storage 20, a main memory 18, an input unit 10, a display 14, and a network communication unit 16.

Storage 20 is a device that stores information, and stores various programs, data and the like. Storage 20 stores operating history data 110 for the equipment devices.

Main memory 18 is a working memory such as a dynamic random access memory (DRAM). Input unit 10 is a keyboard, a mouse or the like, which is used by a user to perform operations. Input unit 10 can include an interface device that accepts data input from other systems. Display 14 may be a liquid crystal display, an organic electro luminescence (EL) display, or the like. CPU 12 performs various functions by executing the programs stored in storage 20. In other aspects, each function may be performed by a circuit element or other hardware configured to perform the function. Network communication unit 16 is provided to be communicable with other devices via a network.

Figure 2:
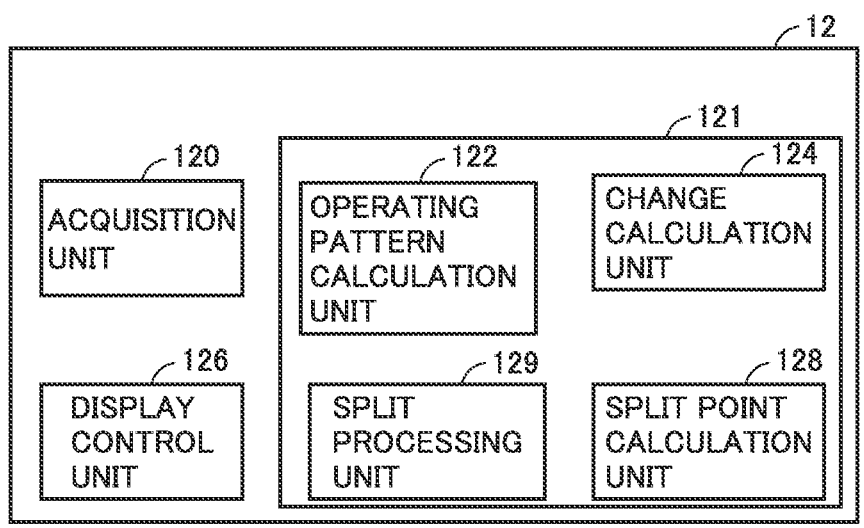
FIG. 2 is a diagram illustrating functional blocks of a management device 100 according to the embodiment.

FIG. 2 is a diagram illustrating functional blocks of management device 100 according to the embodiment. Referring to FIG. 2, CPU 12 includes an acquisition unit 120, a classification processing unit 121, and a display control unit 126. Classification processing unit 121 includes an operating pattern calculation unit 122, a change calculation unit 124, a split point calculation unit 128, and a split processing unit 129.

Acquisition unit 120 acquires operating history data 110 stored in storage 20.

Classification processing unit 121 classifies, based on operating history data 110 acquired by acquisition unit 120, an operating pattern of an equipment device in a prescribed time period.

Operating pattern calculation unit 122 calculates, based on operating history data 110 acquired by acquisition unit 120, a first operating pattern in a first time period and a second operating pattern in a remaining second time period when the prescribed time period is divided into unit time periods.

Change calculation unit 124 calculates a degree of change in the operating pattern using the first operating pattern and the second operating pattern when the prescribed time period is divided into unit time periods.

Split point calculation unit 128 calculates, as a split time point, a time point where the degree of change satisfies a prescribed condition for the prescribed time period.

Split processing unit 129 controls classification processing unit 121 as a whole, and splits the prescribed time period at the calculated split time point.

Display control unit 126 causes display of a result of the split of the prescribed time period on display 14.

B. Specific Example of Split

FIGS. 3A to 3D are diagrams illustrating the concept of a split for an operating pattern of an equipment device in a prescribed time period according to the embodiment.

FIG. 3A shows a pre-split time period from a certain beginning to an end, and shows a virtual split point at a certain position where the time period is split.

In this example, the pre-split time period is split at the virtual split point into a post-split time period TA and a post-split time period TB. Time period TA is a time period from the certain beginning to the virtual split point. Time period TB is a time period from the virtual split point to the end.

FIG. 3B shows an operating ratio of an equipment device for each time of day in time period TA (first operating pattern). This example shows that the equipment device operates from 6:00 to 17:00 in time period TA.

FIG. 3C shows an operating ratio of the equipment device for each time of day in time period TB (second operating pattern). This example shows that the equipment device operates from 9:00 to 18:00 in time period TB.

FIG. 3D shows a degree of change between the operating ratio for each time of day in time period TA (first operating pattern) and the operating ratio for each time of day in time period TB (second operating pattern). This example shows that a waveform difference is calculated as the degree of change. Specifically, the mean square error is calculated in an exemplary method of calculating a waveform difference. Alternatively, an integral value of the absolute value of the difference may be calculated in another method of calculating a waveform difference.

In this example, the degree of change is calculated by, for example, changing the virtual split point on a per unit time period basis (for example, one day) for the pre-split time period from the certain beginning to the end.

Figure 4A:
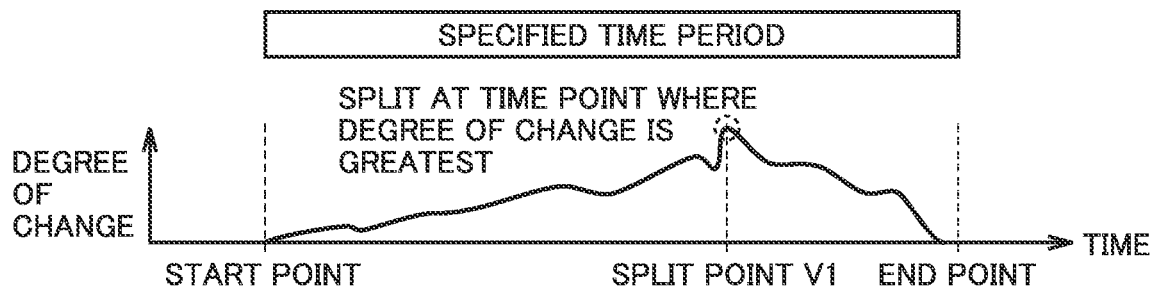
FIGS. 4A to 4C are diagrams illustrating a degree of change in the equipment device in a specified time period.
Figure 4B:
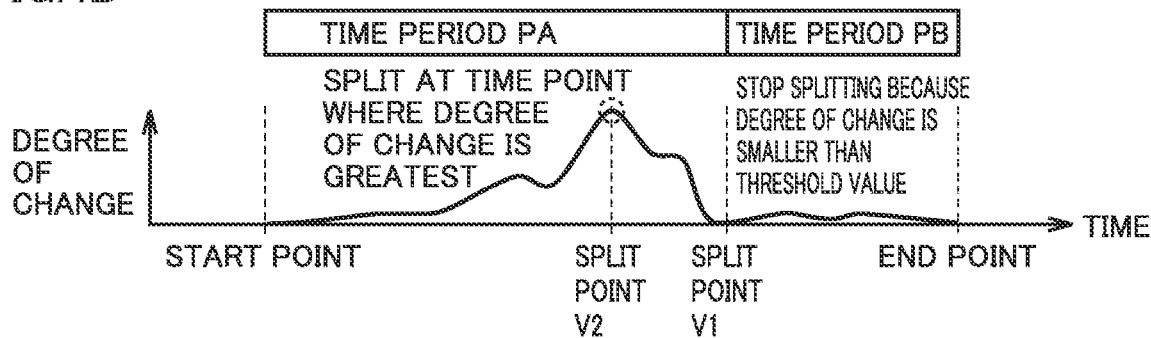
Figure 4C:
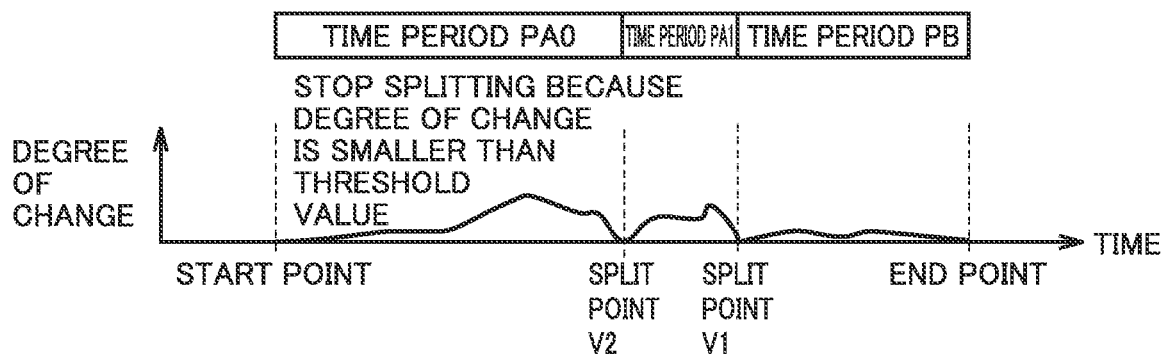

FIGS. 4A to 4C are diagrams illustrating a degree of change in the equipment device in a specified time period. Referring to FIG. 4A, the specified time period is a time period from a start point to an end point. For the specified time period, the degree of change in the equipment device is calculated when the virtual split point is changed from the start point to the end point.

As shown in this figure, as a result of the calculation, a position where the degree of change is greatest is identified at a split point V1 . This example describes, as a split condition, splitting the time period at a position where the degree of change exceeds a prescribed threshold value and the degree of change is greatest, for example. That is, split point V1 is a time point where the split condition is satisfied.

Referring to FIG. 4B, a time period PA and a time period PB are shown when the specified time period is split at split point V1.

For time period PA (from the start point to split point V1), the degree of change in the equipment device is calculated when the virtual split point is changed from the start point to split point V1.

For time period PB (from split point V1 to the end point), the degree of change in the equipment device is calculated when the virtual split point is changed from split point V1 to the end point.

As shown in this figure, as a result of the calculation, a position where the degree of change is greatest is identified at a split point V2 for time period PA. Split point V2 is a time point where the split condition is satisfied.

During time period PB, on the other hand, it is shown that the degree of change is smaller than the threshold value. Since the degree of change is lower than the threshold value, the split condition is not satisfied. Therefore, the time period is not split in this case.

Referring to FIG. 4C, a time period PA0 and a time period PA1 are shown when time period PA is split at split point V2.

For time period PA0 (from the start point to split point V2), the degree of change in the equipment device is calculated when the virtual split point is changed from the start point to split point V2.

For time period PA1 (from split point V2 to split point V1), the degree of change in the equipment device is calculated when the virtual split point is changed from split point V2 to split point V1.

During time periods PA0 and PA1, it is shown that the degree of change is smaller than the threshold value. Since the degree of change is lower than the threshold value, the split condition is not satisfied. Therefore, the time period is not split in this case.

This process completes the splitting process for the operating pattern.

By calculating the degree of change in the operating pattern, and splitting the time period at the point where the degree of change is greatest, the operating pattern can be efficiently classified.

In this example, this process by classification processing unit 121 can classify the specified time period into three time periods of operating patterns. This allows a manager to readily identify when the operating pattern has changed in the specified time period, and this identification allows the manager to know an operational status of the equipment device and perform efficient operation control.

C. Process Flow

Figure 5:
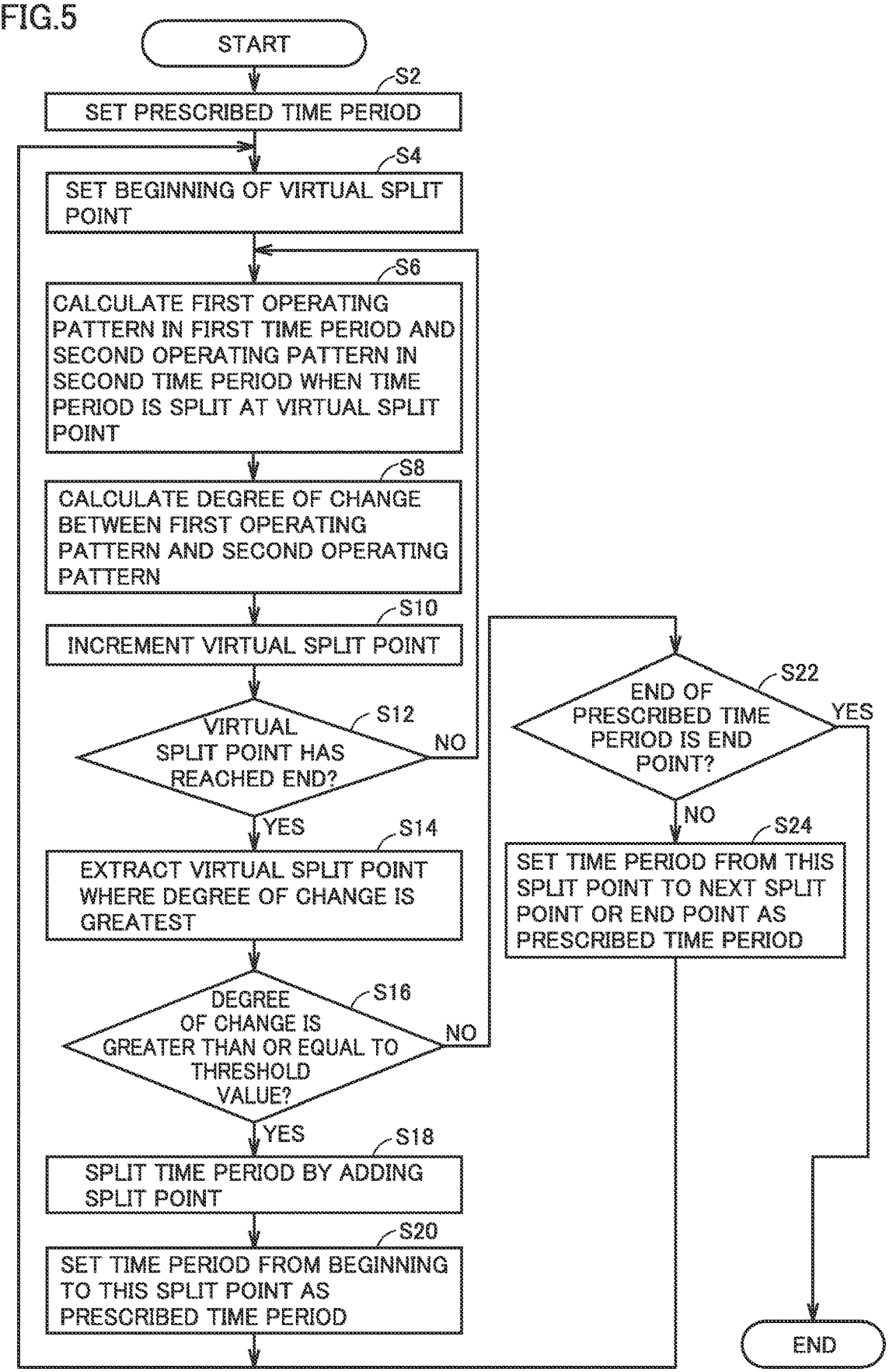
FIG. 5 is a diagram illustrating a process of a classification processing unit 121 according to the embodiment.

FIG. 5 is a diagram illustrating the process of classification processing unit 121 according to the embodiment. Referring to FIG. 5, split processing unit 129 sets a prescribed time period to be split (step S2). For example, split processing unit 129 sets the time period from the start point to the end point described in FIG. 4 as the prescribed time period. In this case, the start point is the beginning of the prescribed time period, and the end point is the end of the prescribed time period.

Then, split processing unit 129 sets a beginning of a virtual split point (step S4). Specifically, the day after the beginning of the prescribed time period is set as the beginning of the virtual split point.

Then, operating pattern calculation unit 122 splits, based on operating history data 110, the prescribed time period at the virtual split point into a first time period (time period TA) and a second time period (time period TB). Operating pattern calculation unit 122 calculates a first operating pattern based on the operating history data in the first time period (time period TA). Operating pattern calculation unit 122 calculates a second operating pattern based on the operating history data in the second time period (time period TB).

Then, change calculation unit 124 calculates a degree of change between the first operating pattern and the second operating pattern. Change calculation unit 124 calculates a waveform difference as the degree of change. Specifically, the mean square error is calculated in an exemplary method of calculating a waveform difference.

Then, split processing unit 129 increments the virtual split point (step S10). Specifically, the virtual split point is set to the next day.

Then, split processing unit 129 determines whether or not the virtual split point has reached the end (step S12).

When split processing unit 129 determines that the virtual split point has not reached the end (NO in step S12), split processing unit 129 returns to (step S6) and repeats the above-described process.

When split processing unit 129 determines that the virtual split point has reached the end (YES in step S12), on the other hand, split processing unit 129 extracts a virtual split point where the degree of change is greatest (step S14). Specifically, through the above-described process, the degree of change from the start point to the end point is calculated as shown in FIG. 4A. Then, split point V1 is extracted as the virtual split point where the degree of change is greatest.

Then, split processing unit 129 determines whether or not the degree of change is greater than or equal to a threshold value (step S16).

Then, when split processing unit 129 determines that the degree of change is greater than or equal to the threshold value (YES in step S16), split processing unit 129 splits the time period by adding a split point (step S18). In this example, the specified time period is split by the addition of split point V1. Specifically, through the above-described process, the specified time period is split into time period PA and time period PB as shown in FIG. 4B.

Then, split processing unit 129 sets a time period from the beginning to this split point as the prescribed time period (step S20). Specifically, a time period from the start point to split point V1 shown in FIG. 4B is set as the prescribed time period.

Then, a return is made to step S4, where the above-described process is repeated. In this case, specifically, the degree of change from the start point to split point V1 is calculated as shown in FIG. 4B. Then, in step S14, split point V2 is extracted as the virtual split point where the degree of change is greatest.

Then, in step S16, split processing unit 129 determines whether or not the degree of change is greater than or equal to the threshold value. When split processing unit 129 determines that the degree of change is greater than or equal to the threshold value (YES in step S16), split processing unit 129 splits the time period by adding split point V2 in step S18. In this example, through the above-described process, prescribed time period PA is split into time periods PA0 and PA1 as shown in FIG. 4C.

Then, in step S20, split processing unit 129 sets a time period from the beginning to this split point as the prescribed time period. Specifically, a time period from the start point to split point V2 shown in FIG. 4C is set as the prescribed time period.

Then, a return is made to step S4, where the above-described process is repeated. In this case, specifically, the degree of change from the start point to split point V2 is calculated as shown in FIG. 4C. Then, in step S14, a virtual split point where the degree of change is greatest in this time period is extracted.

When split processing unit 129 determines in step S16 that the degree of change is not greater than or equal to the threshold value (NO in step S16), split processing unit 129 proceeds to step S22. Specifically, the virtual split point where the degree of change is greatest in time period PA0 is less than the threshold value as shown in FIG. 4C.

Then, split processing unit 129 determines whether or not the end of the prescribed time period is the end point (step S22).

When split processing unit 129 determines in step S22 that the end of the prescribed time period is the end point (YES in step S22), split processing unit 129 ends the process (END).

When split processing unit 129 determines in step S22 that the end of the prescribed time period is not the end point (NO in step S22), on the other hand, split processing unit 129 sets a time period from this split point to the next split point or the end point as the prescribed time period (step S24).

Specifically, a time period from split point V2 to next split point V1 is set as the prescribed time period as shown in FIG. 4C. Then, a return is made to step S4, where the above-described process is repeated. In this case, specifically, the degree of change from split point V2 to split point V1 is calculated as shown in FIG. 4C. Then, in step S14, a split point is extracted as the virtual split point where the degree of change is greatest.

When split processing unit 129 determines in step S16 that the degree of change is not greater than or equal to the threshold value (NO in step S16), split processing unit 129 proceeds to step S22. Specifically, the virtual split point where the degree of change is greatest in time period PA1 is less than the threshold value as shown in FIG. 4C.

Then, split processing unit 129 determines whether or not the end of the prescribed time period is the end point (step S22).

When split processing unit 129 determines in step S22 that the end of the prescribed time period is the end point (YES in step S22), split processing unit 129 ends the process (END).

When split processing unit 129 determines in step S22 that the end of the prescribed time period is not the end point (NO in step S22), on the other hand, split processing unit 129 sets a time period from this split point to the next split point or the end point as the prescribed time period (step S24).

Specifically, a time period from split point V1 to the end point is set as the prescribed time period as shown in FIG. 4C. Then, a return is made to step S4, where the above-described process is repeated. In this case, specifically, the degree of change from split point V1 to the end point is calculated as shown in FIG. 4C. Then, in step S14, a split point is extracted as the virtual split point where the degree of change is greatest. Then, in step S14, the virtual split point where the degree of change is greatest in this time period is extracted.

When split processing unit 129 determines in step S16 that the degree of change is not greater than or equal to the threshold value (NO in step S16), split processing unit 129 proceeds to step S22. Specifically, the virtual split point where the degree of change is greatest in time period PB is less than the threshold value as shown in FIG. 4C.

Then, split processing unit 129 determines whether or not the end of the prescribed time period is the end point (step S22).

When split processing unit 129 determines in step S22 that the end of the prescribed time period is the end point (YES in step S22), split processing unit 129 ends the process (END). In this example, the process ends because the end of time period PB is the end point.

This process can calculate a split point (point of change) with a large degree of change in the specified time period, and split the specified time period at this split point (point of change), to thereby classify the operating pattern.

D. Classification Result

Figure 6:
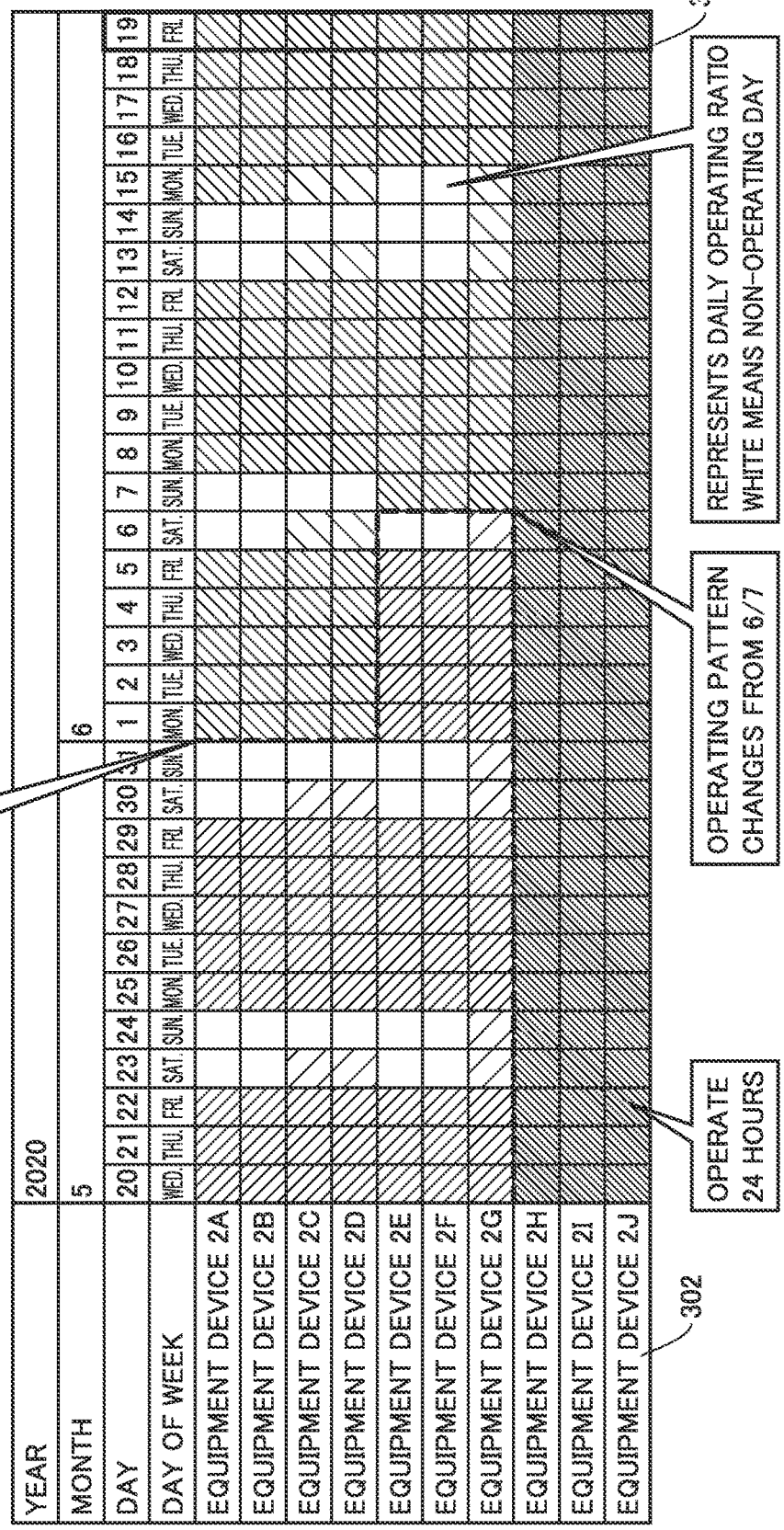
FIG. 6 is a diagram illustrating a process of a display control unit 126 according to the embodiment.

FIG. 6 is a diagram illustrating the process of display control unit 126 according to the embodiment.

Referring to FIG. 6, there is shown a classification result screen 300 displayed on display 14. Display control unit 126 causes display of a classification result of the operating pattern of the equipment device that has been classified by classification processing unit 121.

Classification result screen 300 shows, as an example, an operational status for each equipment device from May 20 through Jun. 19, 2020. Equipment devices 2A to 2J are illustrated as an example.

A daily operating ratio of each equipment device is hatched.

It is shown that equipment devices 2H to 2J are operating 24 hours each day.

It is also shown that the operating patterns of equipment devices 2A to 2D change from Jun. 1, 2020. It is also shown that the operating patterns of equipment devices 2E to 2G change from Jun. 7, 2020.

It is shown that a cursor 304 is set to Jun. 19, 2020. This cursor 304 is provided so that it can be moved by user operation via input section 10. For example, when cursor 304 is moved to this position and selected, the date and time of a similar operating pattern to this date may be extracted and displayed. Alternatively, for example, when cursor 304 is moved to an object 302 which is an equipment device item and selected, detailed information about this equipment device can be checked.

The operating ratio is not limited to be hatched, but may be indicated by a color, a gray scale, or the like.

First Variation

The above embodiment has described classifying the operating pattern of the equipment device based on the operating pattern of the operating ratio for each time of day.

A first variation of the embodiment describes classifying the operating pattern of the equipment device based on an operating pattern of an operating ratio for each day of the week.

FIGS. 7A to 7D are diagrams illustrating the concept of a split for an operating pattern of an equipment device in a prescribed time period according to the first variation of the embodiment.

Figure 7A:
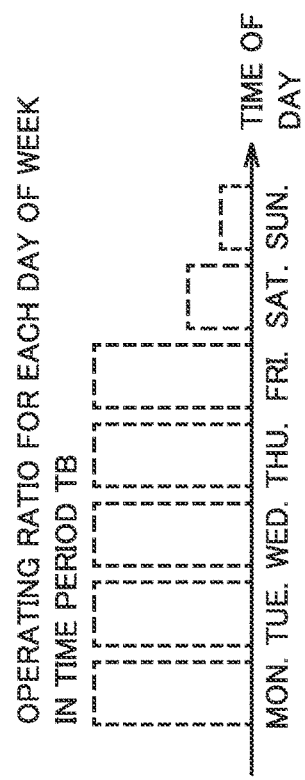
FIGS. 7A to 7D are diagrams illustrating the concept of a split for an operating pattern of an equipment device in a prescribed time period according to a first variation of the embodiment.

FIG. 7A shows a pre-split time period from a certain beginning to an end, and shows a virtual split point at a certain position where the time period is split, as in FIG. 3A.

Figure 7B:
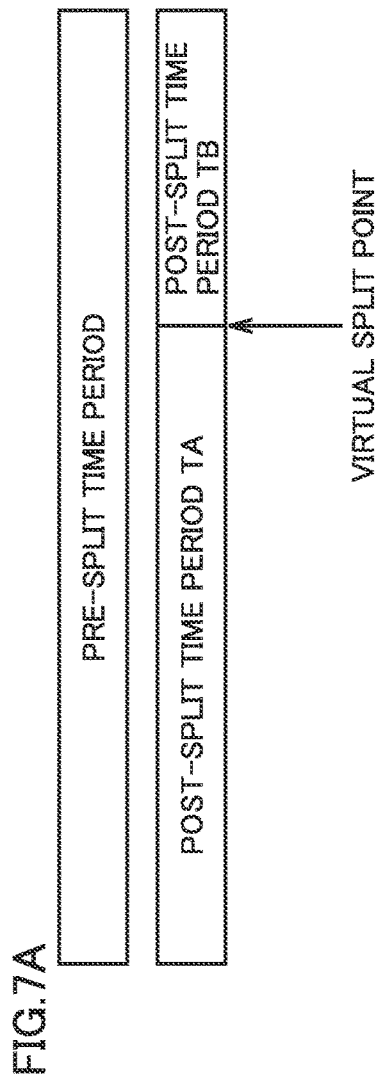

FIG. 7B shows an operating ratio of an equipment device for each day of the week in time period TA (first operating pattern). This example shows an operating ratio of the equipment device for each day of the week, i.e., Monday, Tuesday, Wednesday, Thursday, Friday, Saturday and Sunday, in time period TA.

Figure 7C:
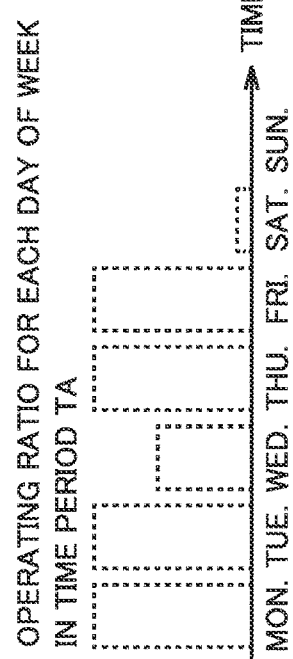

FIG. 7C shows an operating ratio of the equipment device for each day of the week in time period TB (second operating pattern). This example shows an operating ratio of the equipment device for each day of the week, i.e., Monday, Tuesday, Wednesday, Thursday, Friday, Saturday and Sunday, in time period TA.

Figure 7D:
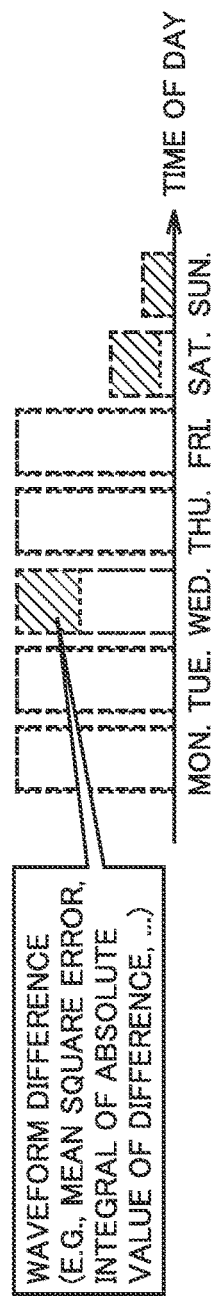

FIG. 7D shows a degree of change between the operating ratio for each day of the week in time period TA (first operating pattern) and the operating ratio for each day of the week in time period TB (second operating pattern). This example shows that a waveform difference is calculated as the degree of change. Specifically, the mean square error is calculated in an exemplary method of calculating a waveform difference. Alternatively, an integral value of the absolute value of the difference may be calculated in another method of calculating a waveform difference.

In this example, the degree of change is calculated by, for example, changing the virtual split point on a per unit time period basis (for example, one day) for the pre-split time period from the certain beginning to the end.

By calculating this degree of change, the prescribed time period can be split in accordance with the above-described flow of FIG. 5.

This process can calculate a split point (point of change) with a large degree of change in the specified time period, and split the specified time period at this split point (point of change), to thereby classify the operating pattern.

Display control unit 126 causes display of a classification result of the operating pattern of the equipment device that has been classified by classification processing unit 121. Specifically, as was described in FIG. 6, display control unit 126 causes display of a change in this operating pattern as the classification result screen.

This allows a manager to readily know the change in the operating pattern, which then allows the manager to efficiently perform operation control based on this change information.

Second Variation

The above first variation of the embodiment has described classifying the operating pattern using the operating ratio of the equipment device for each day of the week.

A second variation of the embodiment describes classifying the operating pattern using a distribution of an operation mode of the equipment device.

FIGS. 8A to 8D are diagrams illustrating the concept of a split for a distribution pattern of an operation mode of an equipment device in a prescribed time period according to the second variation of the embodiment.

Figure 8A:
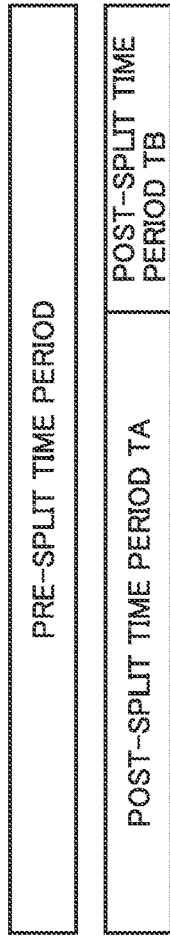
FIGS. 8A to 8D are diagrams illustrating the concept of a split for a distribution pattern of an operation mode of an equipment device in a prescribed time period according to a second variation of the embodiment.

FIG. 8A shows a pre-split time period from a certain beginning to an end, and shows a virtual split point at a certain position where the time period is split, as in FIG. 3A.

Figure 8B:
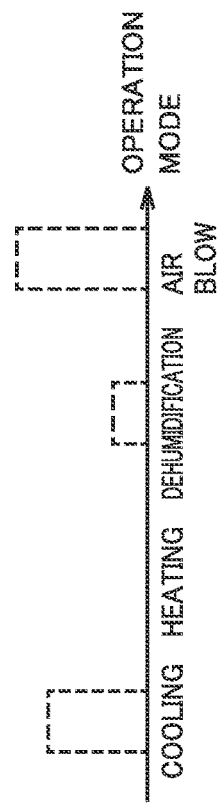

FIG. 8B shows a distribution of an operation mode of an equipment device in time period TA (first operating pattern). This example shows cooling, heating, dehumidification, and air blow as the operation mode of the equipment device in time period TA.

Figure 8C:
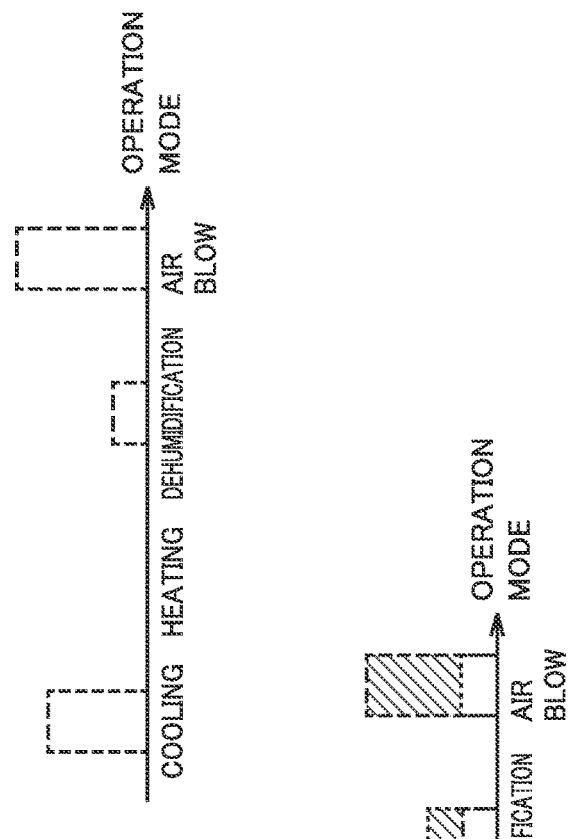

FIG. 8C shows a distribution of the operation mode of the equipment device in time period TB (second operating pattern). This example shows cooling, heating, dehumidification, and air blow as the operation mode of the equipment device in time period TA.

Figure 8D:
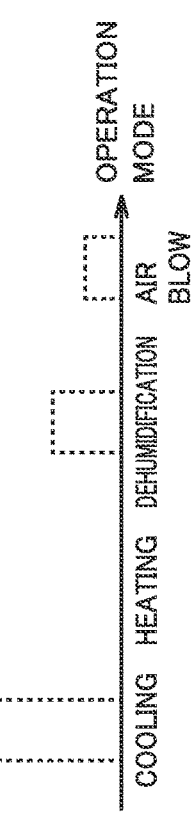

FIG. 8D shows a degree of change between the distribution of the operation mode in time period TA (first operating pattern) and the distribution of the operation mode in time period TB (second operating pattern). This example shows that a distribution difference is calculated as the degree of change. Specifically, the KL divergence, the JS divergence, the KS test statistic, the Anderson-Darling test statistic, the sum of absolute values of differences, or the like may be used in an exemplary method of calculating a distribution difference.

In this example, the degree of change is calculated by, for example, changing the virtual split point on a per unit time period basis (for example, one day) for the pre-split time period from the certain beginning to the end.

By calculating this degree of change, the prescribed time period can be split in accordance with the above-described flow of FIG. 5.

This process can calculate a split point (point of change) with a large degree of change in the specified time period, and split the specified time period at this split point (point of change), to thereby classify the operating pattern.

Display control unit 126 causes display of a classification result of the operating pattern of the equipment device that has been classified by classification processing unit 121. Specifically, as was described in FIG. 6, display control unit 126 causes display of a change in this operating pattern as the classification result screen.

This allows a manager to readily know the change in the operating pattern of the equipment device, which then allows the manager to efficiently perform operation control based on this change information.

Third Variation

The above second variation of the embodiment has described classifying the operating pattern using the distribution of the operation mode of the equipment device.

A third variation of the embodiment describes classifying the operating pattern using a distribution of a set temperature of the equipment device.

FIGS. 9A to 9D are diagrams illustrating the concept of a split for a distribution pattern of an operation mode of an equipment device in a prescribed time period according to the third variation of the embodiment.

FIG. 9A shows a pre-split time period from a certain beginning to an end, and shows a virtual split point at a certain position where the time period is split, as in FIG. 3A.

FIG. 9B shows a distribution of a set temperature of an equipment device in time period TA (first operating pattern). This example shows 25° C., 26° C., 27° C. and 28° C. as the set temperature of the equipment device in time period TA.

FIG. 9C shows a distribution of the operation mode of the equipment device in time period TB (second operating pattern). This example shows 25° C., 26° C., 27° C. and 28° C. as the set temperature of the equipment device in time period TB.

FIG. 9D shows a degree of change between the distribution of the set temperature in time period TA (first operating pattern) and the distribution of the set temperature in time period TB (second operating pattern). This example shows that a distribution difference is calculated as the degree of change. Specifically, the KL divergence, the JS divergence, the KS test statistic, the Anderson-Darling test statistic, the sum of absolute values of differences, or the like may be used in an exemplary method of calculating a distribution difference.

In this example, the degree of change is calculated by, for example, changing the virtual split point on a per unit time period basis (for example, one day) for the pre-split time period from the certain beginning to the end.

By calculating this degree of change, the prescribed time period can be split in accordance with the above-described flow of FIG. 5.

This process can calculate a split point (point of change) with a large degree of change in the specified time period, and split the specified time period at this split point (point of change), to thereby classify the operating pattern.

Display control unit 126 causes display of a classification result of the operating pattern of the equipment device that has been classified by classification processing unit 121. Specifically, as was described in FIG. 6, display control unit 126 causes display of a change in this operating pattern as the classification result screen.

This allows a manager to readily know the change in the operating pattern of the equipment device, which then allows the manager to efficiently perform operation control based on this change information.

Fourth Variation

The above embodiment has described classifying the operating pattern of the equipment device based on the operating pattern of the operating ratio for each time of day. In so doing, the operating pattern is classified based on the degree of change between the first operating pattern and the second operating pattern that are split at the virtual split point.

A fourth variation of the embodiment describes classifying the operating pattern based on a degree of change obtained by a comparison between an operating pattern of the equipment device in the entire prescribed time period, and each of a first operating pattern and a second operating pattern that are split at the virtual split point.

FIGS. 10A to 10D are diagrams illustrating the concept of a split for an operating pattern of an equipment device in a prescribed time period according to the fourth variation of the embodiment.

Figure 10A:
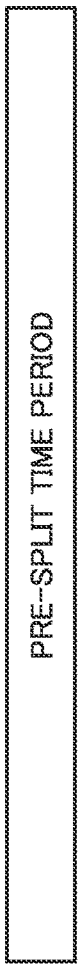
FIGS. 10A to 10D are diagrams illustrating the concept of a split for an operating pattern of an equipment device in a prescribed time period according to a fourth variation of the embodiment.

FIG. 10A shows a pre-split time period from a certain beginning to an end, and shows a virtual split point at a certain position where the time period is split, as in FIG. 3A.

Figure 10B:
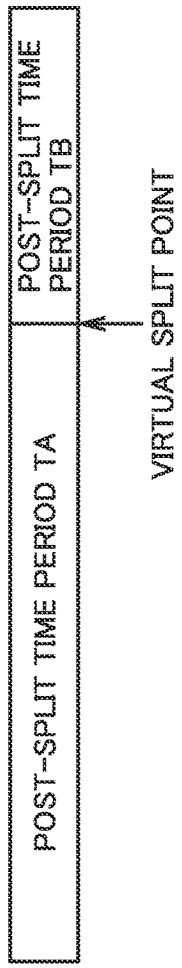

FIG. 10B shows an operating ratio of an equipment device for each time of day in the entire prescribed time period (pre-split time period) (reference operating pattern).

Figure 10C:
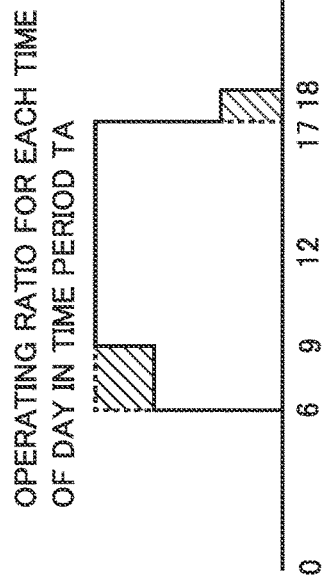

FIG. 10C shows an operating ratio of the equipment device for each time of day in time period TA (first operating pattern). This example shows that the equipment device operates from 6:00 to 17:00 in time period TA.

Figure 10D:
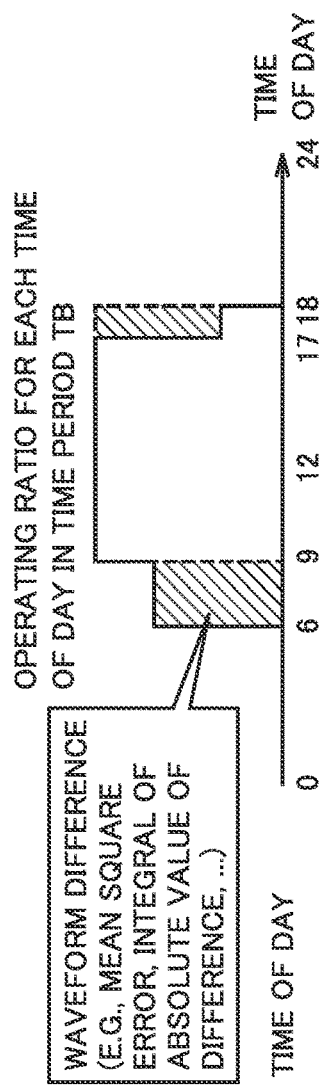

FIG. 10D shows an operating ratio of the equipment device for each time of day in time period TB (second operating pattern). This example shows that the equipment device operates from 9:00 to 18:00 in time period TB.

This example shows a degree of change between the operating ratio of the equipment device for each time of day in the entire prescribed time period (reference operating pattern), and each of the operating ratio for each time of day in time period TA (first operating pattern) and the operating ratio for each time of day in time period TB (second operating pattern).

This example shows that a waveform difference is calculated as the degree of change. Specifically, the mean square error is calculated in an exemplary method of calculating a waveform difference. Alternatively, an integral value of the absolute value of the difference may be calculated in another method of calculating a waveform difference.

In this example, the sum of a value based on the waveform difference between the reference operating pattern and the first operating pattern, and a value based on the waveform difference between the reference operating pattern and the second operating pattern is calculated as the degree of change, for example.

These values based on the waveform differences may be weighted according to the length of the time period to be split, and added together.

In this example, the degree of change is calculated by, for example, changing the virtual split point on a per unit time period basis (for example, one day) for the pre-split time period from the certain beginning to the end.

In this example, the degree of change is calculated by, for example, changing the virtual split point on a per unit time period basis (for example, one day) for the pre-split time period from the certain beginning to the end.

By calculating this degree of change, the prescribed time period can be split in accordance with the above-described flow of FIG. 5.

This process can calculate a split point (point of change) with a large degree of change in the specified time period, and split the specified time period at this split point (point of change), to thereby classify the operating pattern.

Display control unit 126 causes display of a classification result of the operating pattern of the equipment device that has been classified by classification processing unit 121. Specifically, as was described in FIG. 6, display control unit 126 causes display of a change in this operating pattern as the classification result screen.

This allows a manager to readily know the change in the operating pattern, which then allows the manager to efficiently perform operation control based on this change information.

While the foregoing has described making a classification based on the degree of change obtained by the comparison between the operating pattern of the operating ratio of the equipment device for each time of day in the entire prescribed time period, and each of the first operating pattern and the second operating pattern of the operating ratio for each time of day that are split at the virtual split point, the same method is also applicable to the operating pattern of the operating ratio of the equipment device for each day of the week, the distribution of the operation mode of the equipment device, and the distribution of the set temperature of the equipment device.

E. Additional Aspects

While the above embodiment has described a configuration in which the operating history data is prestored in storage 20, the present disclosure is not limited to this configuration. For example, the operating history data may be stored in a server.

The method described in each embodiment above can be stored and distributed, as a program that can be executed by a computer, in a storage medium such as a magnetic disk (like a hard disk), an optical disk (like a compact disc-read only memory (CD-ROM), a digital versatile disc (DVD)), a magneto-optical disk, and a semiconductor memory. The storage medium may be in any storage form as long as it is capable of storing a program and is readable by a computer.

In addition, an operating system running on a computer based on instructions of a program installed on the computer from a storage medium, database management software, middleware such as network software, and the like may perform part of each process to implement the above embodiment. Furthermore, the storage medium in each embodiment is not limited to a medium independent of a computer, but also includes a storage medium that downloads and stores or temporarily stores a program transmitted through a local area network (LAN), the Internet and the like. In addition, the storage medium is not limited to a single storage medium, but a case where the processing in each embodiment above is performed from multiple media is also included in the storage medium of the present disclosure, and the medium/media may have any configuration. The computer in each embodiment performs each process in each embodiment above based on a program stored in a storage medium, and may be in any configuration such as a single device like a personal computer, or a system in which a plurality of devices are connected via a network.

F. Appendix

The embodiment as described above includes the following disclosures.

(Configuration 1)

A management device comprising:
an acquisition unit (120) that acquires operating history data for an equipment device (2) in a prescribed time period; and
a classification processing unit (121) that classifies, based on the operating history data acquired by the acquisition unit, an operating pattern of the equipment device in the prescribed time period,
the classification processing unit including
an operating pattern calculation unit (122) that calculates a first operating pattern in a first time period and a second operating pattern in a remaining second time period when the prescribed time period is divided into unit time periods,
a change calculation unit (124) that calculates a degree of change in the operating pattern using the first operating pattern and the second operating pattern when the prescribed time period is divided into unit time periods,
a split point calculation unit (128) that calculates, as a split time point, a time point where the degree of change satisfies a prescribed condition for the prescribed time period, and
a split processing unit (129) that splits the prescribed time period at the calculated split time point.

(Configuration 2)

The management device according to claim 1, further comprising a display control unit (126) that causes display of a result of the split of the prescribed time period.

(Configuration 3)

The management device according to claim 1, wherein the operating pattern calculation unit calculates a first operating pattern indicating an operating ratio for each time of day in the first time period, and a second operating pattern indicating an operating ratio for each time of day in the second time period.

(Configuration 4)

The management device according to claim 1, wherein the operating pattern calculation unit calculates a first operating pattern indicating an operating ratio for each day of the week in the first time period, and a second operating pattern indicating an operating ratio for each day of the week in the second time period.

(Configuration 5)

The management device according to claim 1, wherein the operating pattern calculation unit calculates a first operating pattern indicating a distribution of each operation mode in the first time period, and a second operating pattern indicating a distribution of the operation mode in the second time period.

(Configuration 6)

The management device according to claim 1, wherein the operating pattern calculation unit calculates a first operating pattern indicating a distribution of each set temperature in the first time period, and a second operating pattern indicating a distribution of the set temperature in the second time period.

(Configuration 7)

The management device according to claim 1, wherein the change calculation unit calculates a waveform difference between the first operating pattern and the second operating pattern as the degree of change.

(Configuration 8)

The management device according to claim 1, wherein the change calculation unit calculates the degree of change in the operating pattern using the operating pattern in the entire prescribed time period, and the first operating pattern and the second operating pattern when the prescribed time period is divided into unit time periods.

(Configuration 9)

A management system comprising:
an acquisition unit (120) that acquires operating history data for an equipment device in a prescribed time period; and
a classification processing unit (121) that classifies, based on the operating history data acquired by the acquisition unit, an operating pattern of the equipment device in the prescribed time period,
the classification processing unit including
an operating pattern calculation unit (122) that calculates a first operating pattern in a first time period and a second operating pattern in a remaining second time period when the prescribed time period is divided into unit time periods,
a change calculation unit (124) that calculates a degree of change in the operating pattern using the first operating pattern and the second operating pattern when the prescribed time period is divided into unit time periods,
a split point calculation unit (128) that calculates, as a split time point, a time point where the degree of change satisfies a prescribed condition for the prescribed time period, and
a split processing unit (129) that splits the prescribed time period at the calculated split time point.

(Configuration 10)

A management method comprising:
acquiring operating history data for an equipment device in a prescribed time period; and
classifying, based on the acquired operating history data, an operating pattern of the equipment device in the prescribed time period,
the classifying including
calculating a first operating pattern in a first time period and a second operating pattern in a remaining second time period when the prescribed time period is divided into unit time periods (S6),
calculating a degree of change in the operating pattern using the first operating pattern and the second operating pattern when the prescribed time period is divided into unit time periods (S8),
calculating, as a split time point, a time point where the degree of change satisfies a prescribed condition for the prescribed time period (S14, S16), and
splitting the prescribed time period at the calculated split time point (S18).

It should be understood that the embodiment disclosed herein is illustrative and not limited to only the description set forth above. The scope of the present disclosure is defined by the scope of the claims, and is intended to include any modifications within the scope and meaning equivalent to the scope of the claims.

REFERENCE SIGNS LIST 2 equipment device; 10 input unit; 14 display; 16 network communication unit; 18 main memory; 20 storage; 100 management device; 110 operating history data; 120 acquisition unit; 121 classification processing unit; 122 operating pattern calculation unit; 124 change calculation unit; 126 display control unit; 128 split point calculation unit; 129 split processing unit; 300 classification result screen; 302 object; 304 cursor.

The invention claimed is:

1. A management device comprising:
a central processing unit (CPU); and
a memory storing a program,
the CPU executing the program to
acquire operating history data for an equipment device in a prescribed time period, and
classify, based on the acquired operating history data, an operating pattern of the equipment device in the prescribed time period and
the classifying the operating pattern including
calculating a first operating pattern in a first time period before a first time point that virtually splits the prescribed time period and a second operating pattern in a remaining second time period,
changing the virtual split time point to a second time point based on a unit time,
calculating a degree of change in the operating pattern using a third operating pattern in a third time period before the second time point and a fourth operating pattern in a fourth time period after the second time point in the prescribed time period when the virtual split time point is changed to the second time point,
calculating, as a split time point, a time point where the degree of change satisfies a prescribed condition for the prescribed time period, and
dividing and classifying the operating pattern of the equipment device at the calculated split time point.

2. The management device according to claim 1, wherein the CPU displays a result of the split of the prescribed time period.

3. The management device according to claim 1, wherein the CPU calculates a first operating pattern indicating an operating ratio for each time of day in the first time period, and a second operating pattern indicating an operating ratio for each time of day in the second time period.

4. The management device according to claim 1, wherein the CPU calculates a first operating pattern indicating an operating ratio for each day of the week in the first time period, and a second operating pattern indicating an operating ratio for each day of the week in the second time period.

5. The management device according to claim 1, wherein the CPU calculates a first operating pattern indicating a distribution of an operating ratio for each operation mode of the equipment device in the first time period, and a second operating pattern indicating a distribution of an operating ratio for each operation mode of the equipment device in the second time period.

6. The management device according to claim 1, wherein the CPU calculates a first operating pattern indicating a distribution of each set temperature in the first time period, and a second operating pattern indicating a distribution of the set temperature in the second time period.

7. The management device according to claim 1, wherein the CPU calculates a waveform difference between the first operating pattern and the second operating pattern as the degree of change.

8. The management device according to claim 1, wherein the CPU calculates the degree of change in the operating pattern using the operating pattern in the entire prescribed time period, and the first operating pattern and the second operating pattern when the virtual split time point is changed to the second time point based on the unit time.

9. A management system comprising:
at least one or more equipment devices;
a central processing unit (CPU); and
a memory storing a program,
the CPU executing the program to
acquire operating history data for the equipment device in a prescribed time period, and
classify, based on the acquired operating history data, an operating pattern of the equipment device in the prescribed time period, and
the classifying the operating pattern including
  calculating a first operating pattern in a first time period before a first time point that virtually splits the prescribed time period and a second operating pattern in a remaining second time period,
  changing the virtual split time point to a second time point based on a unit time,
  calculating a degree of change in the operating pattern using a third operating pattern in a third time period before the second time point and a fourth operating pattern in a fourth time period after the second time point in the prescribed time period when the virtual split time point is changed to the second time point,
  calculating, as a split time point, a time point where the degree of change satisfies a prescribed condition for the prescribed time period, and
  dividing and classifying the operating pattern of the equipment device at the calculated split time point.

10. A management method comprising:
acquiring operating history data for an equipment device in a prescribed time period; and
classifying, based on the acquired operating history data, an operating pattern of the equipment device in the prescribed time period,
the classifying the operating pattern including
  calculating a first operating pattern in a first time period before a first time point that virtually splits the prescribed time period and a second operating pattern in a remaining second time period,
  changing the virtual split time point to a second time point based on a unit time,
  calculating a degree of change in the operating pattern using a third operating pattern in a third time period before the second time point and a fourth operating pattern in a fourth time period after the second time point in the prescribed time period when the virtual split time point is changed to the second time point,
  calculating, as a split time point, a time point where the degree of change satisfies a prescribed condition for the prescribed time period, and
  dividing and classifying the operating pattern of the equipment device at the calculated split time point.

* * * * *